United States Patent [19]
Ishii et al.

[11] 3,807,629
[45] Apr. 30, 1974

[54] SLIDE RULE FOR TIME DIFFERENCE

[75] Inventors: Arahito Ishii, Tokyo; Osamu Fukui, Nishinomiya, both of Japan

[73] Assignee: Matsuo Sangyo Co., Ltd., Osaka-shi, Osaka-fu, Japan

[22] Filed: Mar. 2, 1973

[21] Appl. No.: 337,478

[30] Foreign Application Priority Data
April 3, 1972 Japan..........................47-39702

[52] U.S. Cl. .................................. 235/89 R, 35/70
[51] Int. Cl. ............................................. G06c 3/00
[58] Field of Search ............ 235/70, 77, 78, 85, 88, 235/89 R; 58/42.5, 43–44; 35/40–42, 75

[56] References Cited
UNITED STATES PATENTS
| | | | |
|---|---|---|---|
| 445,392 | 1/1891 | Cowell | 35/40 |
| 635,268 | 10/1899 | Osse | 35/40 |
| 3,083,906 | 4/1963 | Giuntini | 235/89 R |
| 434,137 | 8/1890 | Plechawski | 58/42.5 |
| 3,302,387 | 2/1967 | Wedde | 58/42.5 |

Primary Examiner—Lawrence R. Franklin
Attorney, Agent, or Firm—Wenderoth, Lind & Ponack

[57] ABSTRACT

A slide rule for computing a time difference is disclosed. The slide rule comprises a map plate and a transparent scale plate having the map plate slidably inserted therein. A world map is provided on the map plate and graduation lines corresponding to longitude of the map are graduated on the scale plate correspondingly to a reduced scale of the world map. The graduation lines are adapted to show a maximum of 48 hours, i.e., two days of time differences. Figures are provided on each graduation line to show times based on the Greenwich Mean Time. Other figures may be provided on each graduation line to show time differences.

7 Claims, 7 Drawing Figures

PATENTED APR 30 1974 3,807,629

SLIDE RULE FOR TIME DIFFERENCE

The present invention relates to a slide rule for time differences, and more particularly to a slide rule enabling one to know the corresponding time in other places based on the G.M.T. (Greenwich Mean Time) in respect to the present time in one selected place, or to know the time differences between two places of the world.

An object of the present invention is to provide a slide rule for computing time differences which is handy and easy to refer for students or overseas travelers.

Other objects, features and advantages of the invention will become apparent from the following description taken in connection with the accompanying drawings in which.

Figure 1:
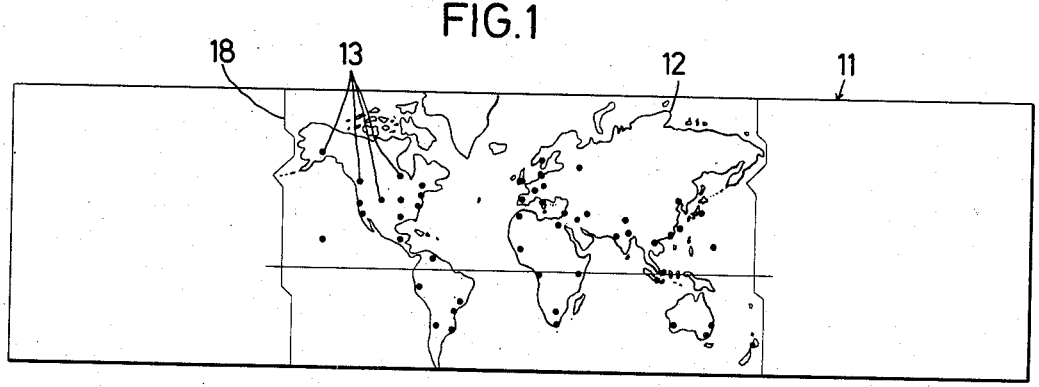
FIG. 1 is a plan of a map plate.
Figure 2:
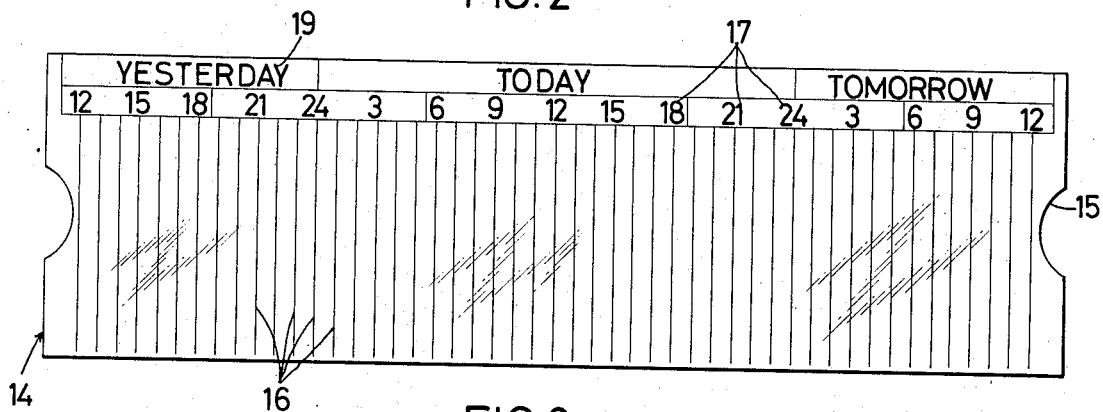
FIG. 2 is a plan of a scale plate.

Referring to the drawings, numeral 11 is a thin map plate, a world map 12 being printed in the center of the surface thereof, dot marks 13 being provided on the map 12 so as to show various big cities of the world for ready reference for users. Numeral 18 shows the international dateline, the same dateline being provided at the right of the map 12. The map plate 11 is adapted to be substantially twice as long as the space between the right and left datelines 18, that is, each of the blank spaces in the left and right of the map 12 is substantially half of the world map 12.

Figure 4:
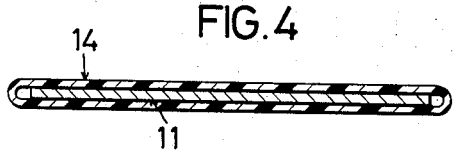
FIG. 4 is a transversely sectioned side view of FIG. 3, FIGS. 5 and 6 are the same views as FIG. 4 showing other arrangements, of the scale plate.
Figure 5:
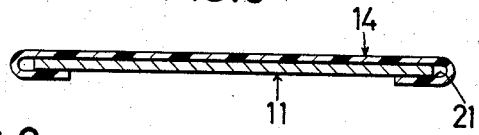
Figure 6:
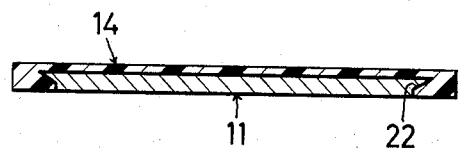

Numeral 14 is a scale plate made of transparent material, said scale plate 14 being of a flat hollow tube open at both ends as shown in FIG. 4, or of a flat plate having turnups 21 or 22 at both sides as shown in FIGS. 5 and 6, for slidably supporting said map plate 11.

A notch 15 is provided at each end of the scale plate 14 for pulling or inserting the map plate 11.

The length of the scale plate 14 is substantially the same as that of the map plate 11.

On the upper surface of the scale plate 14 graduation lines 16 are provided for showing longitude, said lines 16 being spaced by 15 degrees in proportion to the reduced scale of the map 12. Accordingly, any one space between two lines 16 shows a 1 hour difference of time. It is to be noted that the scale plate 14 has 48 graduation lines showing 48 one hour differences of time. It is possible to subdivide the graduation 16, e.g., into half hour intervals.

At the top of each graduation line 16 a time indication figure 17 is provided and shows hours according to the 24 hour system. It is, however, optional to adopt the a.m. and p.m. time system, i.e., 12 hour system.

Among the time indication figures 17, the figures 12 representing 12 o'clock are placed at the center, the figures 15, 18, ...... and 24 being marked to the right, the figures 9, 6, ..... and 24 to the left. It is preferable to provide such figures at the top of each of the graduation lines 16, but some of them are omitted in the drawings for simplification.

The graduation lines having figures 24 should respectively coincide with the right and left datelines 18 in the world map 12, when the map plate 11 is inserted in the scale plate 14 and the map 12 is placed between the right and left lines 16 having figures 24.

A day indication 19 is provided on the upper part of the time indication 17, said day indication 19 being divided into three sections which are respectively labeled YESTERDAY, TODAY and TOMORROW, sectioned correspondingly to the datelines 18.

Each section of the day indication 19 may be colored differently for ready reference.

For further convenience to discriminate between the daytime and nighttime, the graduation lines may be colored differently or indicated by different lines, e.g., solid lines and broken lines.

Figure 7:
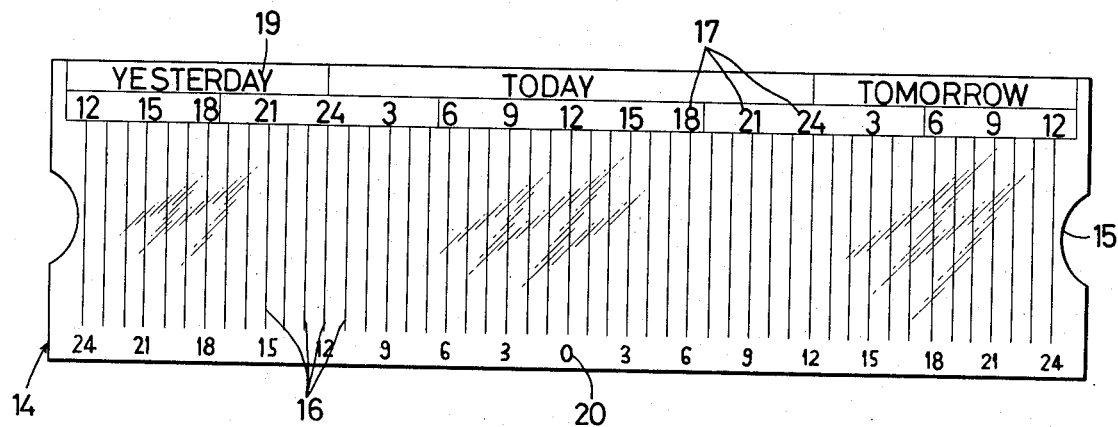
FIG. 7 is a plan showing another embodiment of the scale plate.

In another embodiment shown by FIG. 7, a time difference indicator 20 is provided at the bottom of the graduation lines 16. In the time difference indicator 20, the figure 0 is marked at the basic line 16 having the figures 12 at the top thereof, the serial number 1, 2, . .... 24 being marked in both right and left directions, respectively at the bottom of each graduation line 16, for computing the time difference any between two places in the world.

The method of use of the present slide rule will now be explained with reference to the drawings.

Figure 3:
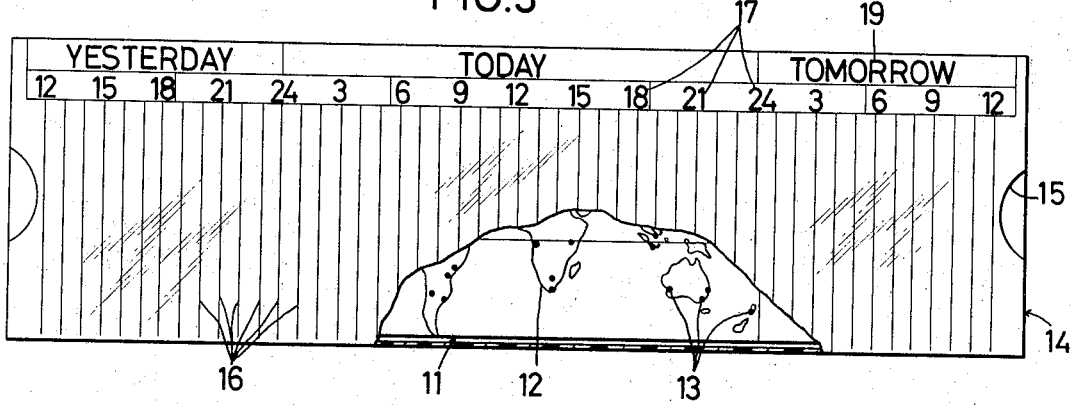
FIG. 3 is a slide rule combination of the map plate and the scale plate, partially broken.

Initially, the map plate 11 is inserted in the scale plate 14 as shown in FIG. 3.

If it is desired to ascertain the present time in other places corresponding to the present time in one selected place in the world, the graduation line 16 having the present time falling in the range of TODAY is aligned with the one selected place on the map 12 by sliding the map plate 11. Then, one is able to know the present time in any other place in the world by reading the time indication 17 at the top of the graduation line 16 running on a required place.

If one needs to know a time difference between two places, the graduation line 16 having figure 0 at the bottom thereof is aligned with one selected place by sliding the map plate 11, thereby providing one with the time difference between one selected place and any other place by reading the time difference indicator 20 at the bottom of the graduation line 16 running on a required place. If the required place is at the left of the basic line having figure 0, the figure obtained is minus time difference. If the place is at the right, it is plus time difference.

According to the present invention, a corresponding time or the time difference between two places is easily obtainable by the above mentioned operation.

What we claim is:

1. A slide rule for computing time differences comprising a map plate having a world map on the surface thereof, and a transparent hollow scale plate having said map plate slidably inserted therein, graduation lines provided on said scale plate so as to show a predetermined time difference, said graduation lines being spaced in relation to the reduced scale of said world map and also to show a maximum 24 hour difference of time from any point on said world map.

2. A slide rule as claimed in claim 1 wherein figures showing time based on a 24 hour system are provided at the top of each graduation line.

3. A slide rule as claimed in claim 1 wherein serial figures beginning at zero are provided thereon for showing time difference, at the bottom of said each graduation line, said figure zero being positioned at the center of the serial figures.

4. A slide rule as claimed in claim 1 wherein dot marks are provided in the world map so as to show big cities or other important places.

5. A slide rule as claimed in claim 1 wherein day indications are provided on the scale plate, said indications being labeled to show yesterday, today and tomorrow and sectioned correspondingly to the international datelines on the world map.

6. A slide rule as claimed in claim 1 wherein said graduation lines are colored differently to distinguish daytime from nighttime.

7. A slide rule as claimed in claim 1 wherein said graduation lines are distinguished by solid and broken lines to show daytime and nighttime.

* * * * *